United States Patent
Furukawa et al.

(10) Patent No.: US 9,863,268 B2
(45) Date of Patent: Jan. 9, 2018

(54) DYNAMIC SYSTEM ESTIMATION DEVICE AND METHOD

(71) Applicant: IHI Corporation, Koto-ku (JP)

(72) Inventors: Hiroyuki Furukawa, Tokyo (JP); Daiki Kakiuchi, Tokyo (JP); Mai Kimura, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/222,084

(22) Filed: Jul. 28, 2016

(65) Prior Publication Data

US 2017/0030216 A1  Feb. 2, 2017

Related U.S. Application Data

(63) Continuation of application No. PCT/JP2015/062717, filed on Apr. 27, 2015.

(30) Foreign Application Priority Data

Apr. 28, 2014  (JP) .................. 2014-092861

(51) Int. Cl.
G05B 13/04 (2006.01)
F01D 25/00 (2006.01)
(Continued)

(52) U.S. Cl.
CPC ........... *F01D 21/003* (2013.01); *F01D 25/00* (2013.01); *F02C 7/00* (2013.01); *G05B 13/04* (2013.01);
(Continued)

(58) Field of Classification Search
CPC ........ G05B 13/00; G05B 13/04; G05B 13/02; F01D 25/00; F02C 7/00; F02C 9/00; F02C 9/28; F02C 9/54; F02C 9/52
(Continued)

(56) References Cited

U.S. PATENT DOCUMENTS 9,317,249 B2 * 4/2016 Moeckly .................. G06F 7/00
2004/0102890 A1   5/2004 Brunell
(Continued)

FOREIGN PATENT DOCUMENTS

JP  62-197657  9/1987
JP  8-123506   5/1996
(Continued)

OTHER PUBLICATIONS

International Search Report dated Aug. 11, 2015 in PCT/JP2015/062717, filed on Apr. 27, 2015 ( with English Translation).
(Continued)

*Primary Examiner* — Tan Q Nguyen
(74) *Attorney, Agent, or Firm* — Oblon, McClelland, Maier & Neustadt, L.L.P.

(57) ABSTRACT

A dynamic system estimation device and method, whereby estimation for more performance parameters than there are sensors can be performed, the estimation taking temporal changes into account. The dynamic system estimation device includes: a prescribed number of sensors that detect prescribed observation values from a gas turbine engine; and a Kalman filter that uses a dynamic model of the gas turbine engine and estimates the state of the gas turbine engine, on the basis of the observation values detected by the sensors. The gas turbine engine includes an element having changes in temporal performance recorded by performance parameters. The Kalman filter enables more than the prescribed number of performance parameters to be estimated, as a result of introducing a first-order lag element in place of the element.

5 Claims, 12 Drawing Sheets

(51) Int. Cl.
*F01D 21/00* (2006.01)
*F02C 7/00* (2006.01)
*G05B 23/02* (2006.01)
*G07C 5/08* (2006.01)

(52) U.S. Cl.
CPC ............. *G05B 23/02* (2013.01); *G07C 5/08* (2013.01); *F05D 2220/32* (2013.01); *F05D 2260/80* (2013.01)

(58) Field of Classification Search
USPC .................................................. 701/101, 32.9
See application file for complete search history.

(56) References Cited

U.S. PATENT DOCUMENTS

| | | | |
|---|---|---|---|
| 2005/0193739 | A1 | 9/2005 | Brunell et al. |
| 2008/0147290 | A1* | 6/2008 | Volponi ................ F02C 9/00 701/100 |
| 2009/0173078 | A1 | 7/2009 | Thatcher et al. |
| 2009/0326890 | A1* | 12/2009 | Shetty ................ G05B 17/02 703/7 |
| 2010/0204808 | A1 | 8/2010 | Thiele |
| 2014/0123624 | A1* | 5/2014 | Minto ................ F23N 5/18 60/39.281 |
| 2016/0208639 | A1* | 7/2016 | Cai ................ F01D 21/003 |

FOREIGN PATENT DOCUMENTS

| | | |
|---|---|---|
| JP | 11-338506 | 12/1999 |
| JP | 2005-134291 A | 5/2005 |
| JP | 2005-171789 | 6/2005 |
| JP | 2005-248946 | 9/2005 |
| JP | 2009-162230 | 7/2009 |
| JP | 2012-517052 | 7/2012 |
| JP | 5046104 | 10/2012 |
| JP | 2013-40565 | 2/2013 |

OTHER PUBLICATIONS

Written Opinion dated Aug. 11, 2015 in PCT/JP2015/062717, filed Apr. 27, 2015.
Decision to Grant dated Nov. 14, 2017 in corresponding Japanese Patent Application No. 2014-092861.
Extended European Search Report dated Nov. 16, 2017 in corresponding European Patent Application No. 15786018.0.

* cited by examiner

DYNAMIC SYSTEM ESTIMATION DEVICE AND METHOD

CROSS REFERENCE TO RELATED APPLICATIONS

This application is a continuation application of international application No. PCT/JP2015/062717 filed Apr. 27, 2015, which claims priority to Japanese Patent Application No. 2014-092861 filed Apr. 28, 2014, each of which is hereby incorporated by reference in their entity.

BACKGROUND

1. Field

This embodiment relates to dynamic system estimation device and method, which estimate a state of a dynamic system and a performance parameter.

2. Description of Related Art

Heretofore, in a dynamic system such as a gas turbine engine composed of a plurality of elements, an estimation device that estimates a state of this dynamic system has been proposed. This estimation device can detect observed values such as the number of engine revolutions, temperature and pressure by sensors, and can estimate a variety of states of the dynamic system by using a Kalman filter provided with a dynamic model. As such an estimation device as described above, for example, a device disclosed in Patent Document 1 is known.

The elements which compose the dynamic system include those in each of which performance is prescribed by a performance parameter. In the elements, the performance parameters are constant irrespective of time as long as temporal changes thereof are not taken into consideration. If the Kalman filter is used, then the performance parameters can be estimated in a case where the temporal changes are taken into consideration; however, the number of the performance parameters which can be estimated has been limited to the number of the sensors or less.

Patent Document

Patent Document 1: JP H08-123506 A

SUMMARY

However, for example, in such a dynamic system as a gas turbine engine, observed values detectable by the sensors, which are the number of engine revolutions, the temperature, the pressure and the like, have been limited, and the number of performance parameters which can be estimated has also been limited. Hence, aged deteriorations and faults of the respective elements of the engine that cannot be observed from outside thereof, has not been able to be specified sufficiently.

Therefore, the dynamic system may become capable of also estimating performance parameters, of which number is larger than the number of sensors, in consideration of temporal changes thereof.

An embodiment according to this application has been proposed in consideration of the above-mentioned actual circumstances. It is an object of the embodiment to provide such dynamic system estimation device and method as capable of also estimating the performance parameters, of which number is larger than the number of sensors, in consideration of the temporal changes thereof.

A dynamic system estimation device according to this embodiment is a dynamic system estimation device that estimates a state and performance parameters of a dynamic system. The dynamic system estimation device includes: a predetermined number of sensors which detect predetermined observed values from the dynamic system; and a Kalman filter that estimates the state of the dynamic system by using a dynamic model of the dynamic system based on the observed values detected by the sensors. The dynamic system includes elements in which temporal changes of performance are described by the performance parameters, and the Kalman filter also enables estimation of performance parameters, of which number is larger than the predetermined number, by introducing first-order lag elements in place of the elements.

Each of the performance parameters may be given as a ratio of an output value of the first-order lag element to an input value of the first-order lag element. The dynamic system may be a gas turbine engine, and the observed values detected by the sensors may include number of revolutions, temperature and pressure in the gas turbine engine.

A dynamic system estimation method according to this embodiment is a dynamic system estimation method for estimating a state and performance parameters of a dynamic system. The dynamic system estimation method includes: a step of detecting predetermined observed values from the dynamic system by a predetermined number of sensors; and a step of estimating the state of the dynamic system by a Kalman filter based on the observed values detected by the sensors, the Kalman filter using a dynamic model of the dynamic system. The dynamic system includes elements in which temporal changes of performance are described by the performance parameters, and the Kalman filter also enables estimation of performance parameters, of which number is larger than the predetermined number, by introducing first-order lag elements in place of the elements.

In In accordance with this embodiment, it becomes possible to also estimate the performance parameters, of which number is larger than the number of sensors, in consideration of the temporal changes thereof. Hence, also in a case where the number of sensors is limited in the dynamic system, temporal changes of the performance of the elements, which are larger in number than the sensors, can be grasped.

DETAILED DESCRIPTION OF EMBODIMENTS

A description is made below in detail of a gas turbine engine estimation device as an embodiment of an estimation device and estimation method of a dynamic system with reference to the drawings.

Figure 1:
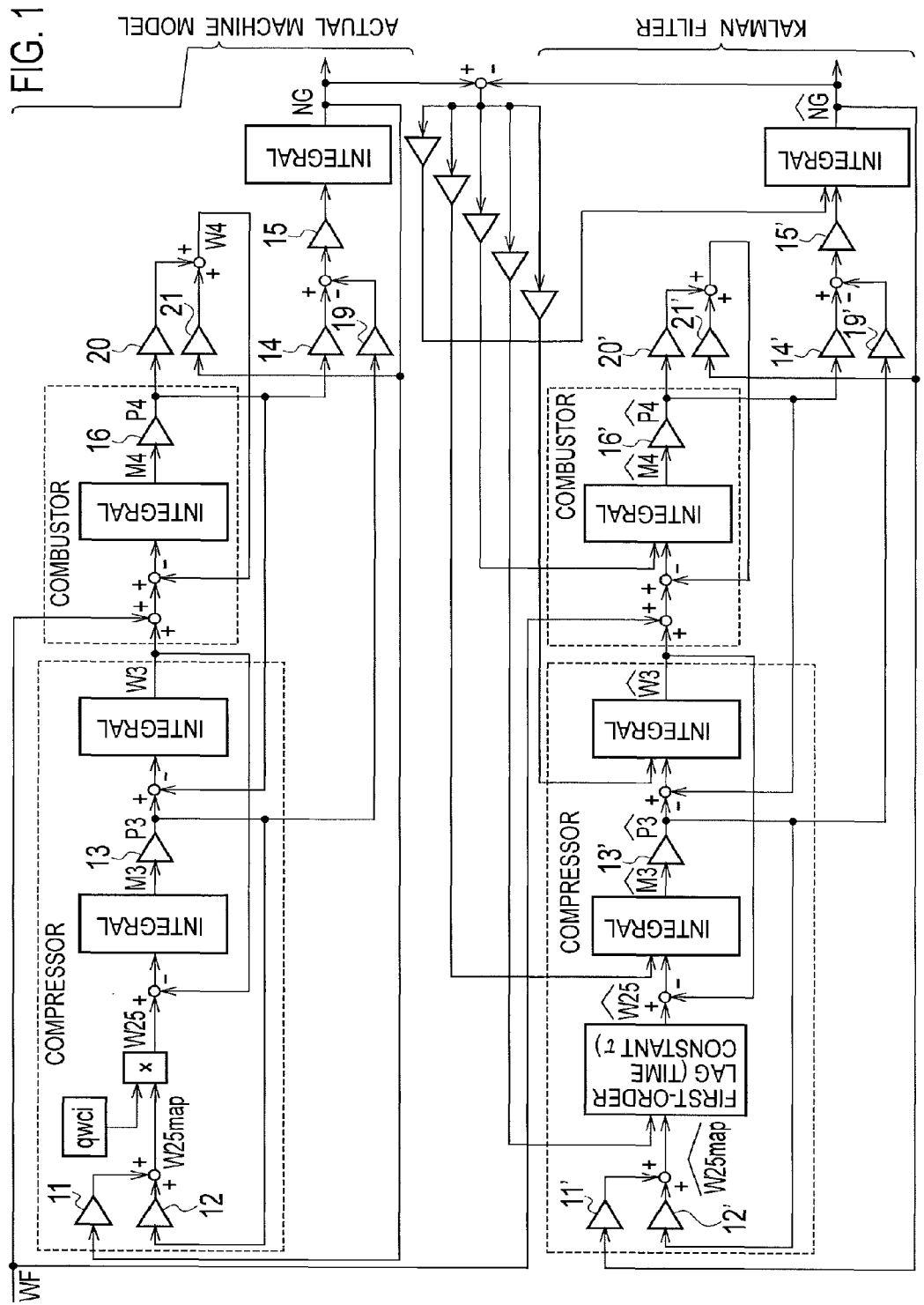
FIG. 1 is a diagram showing a schematic configuration of a gas turbine engine estimation device.

FIG. 1 is a diagram showing a schematic configuration of a gas turbine engine estimation device. In this gas turbine engine estimation device, a model of the actual gas turbine engine is disposed on an upper side of the drawing. As will be described later, this model of the actual gas turbine engine is one in which a configuration including a high-pressure compressor and a combustor is taken out from the gas turbine engine and is formed into a model so as to simplify a configuration of the gas turbine engine and to simulate operations thereof. Moreover, a configuration of a part of a high-pressure turbine is also included in a subsequent stage to the combustor. In the drawing, the high-pressure compressor is simply written as a compressor.

In such a gas turbine engine estimation device, a Kalman filter is disposed on a lower side of the drawing. This Kalman filter includes a configuration, which is similar to that of the model of the actual gas turbine engine, as a dynamic model that represents dynamics of the actual gas turbine engine model. Note that, in the drawing, hats are put onto values estimated by the Kalman filter, and such estimated values are distinguished from variables of the actual model of the gas turbine engine In a compressor of this Kalman filter, a portion, which corresponds to a multiplier that introduces a performance parameter (flow rate variation characteristic coefficient) qwci into the model of the actual gas turbine engine, includes a first-order lag element for estimating this performance parameter qwci. In this embodiment, this first-order lag element is introduced, whereby the performance parameter is converted into a state variable, and it is made possible to estimate temporal changes also for performance parameters, of which number is larger than the number of sensors. Such a first-order lag element will be described later more in detail.

Figure 2:
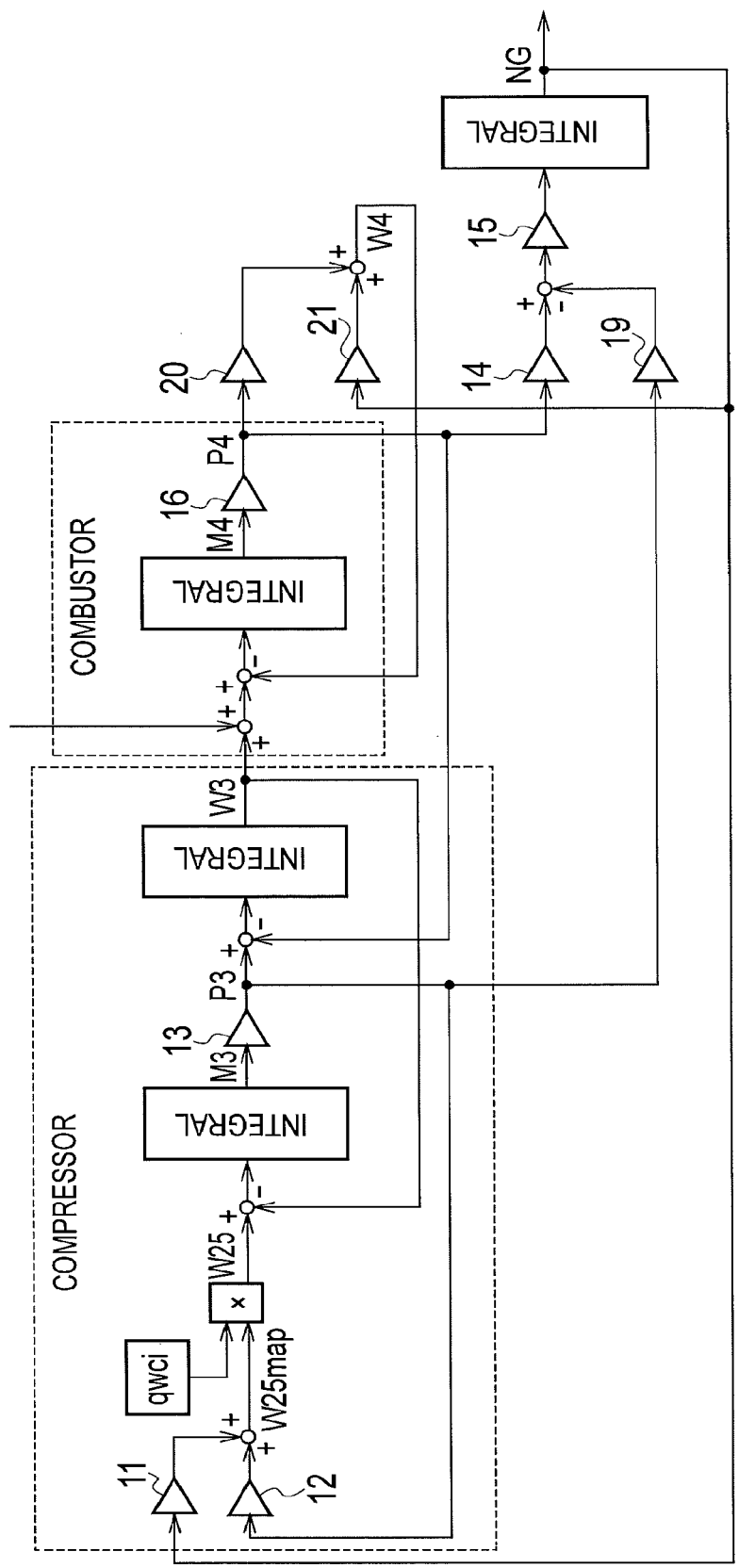
FIG. 2 is a diagram showing a model of an actual gas turbine engine.

FIG. 2 is a diagram showing a configuration of the model of the actual gas turbine engine in the gas turbine engine estimation device shown in FIG. 1. This model of the actual gas turbine engine is configured by being simplified so as to simulate operations of an actual gas turbine engine. Blocks of a compressor and a combustor in the drawing correspond to a high-pressure compressor and combustor of the gas turbine engine, respectively. Moreover, a right-side portion of the block of the combustor corresponds to a part of the high-pressure turbine.

Figure 3:
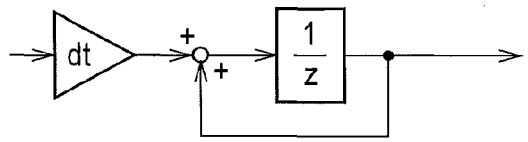
FIG. 3 is a diagram showing a configuration of an integral element.

FIG. 3 is a diagram showing a configuration of an integral element. In this exemplary embodiment, the simulation is performed by a discrete time, and accordingly, an input value is multiplied by an increment dt, and is then integrated. A pennant-shaped block stands for a gain element that multiplies the input value by a constant value. Note that, with regard to a gain element in the Kalman filter, " "0 is added to a reference symbol corresponding thereto, whereby a correspondence relationship thereof with the gain element of the model of the actual gas turbine engine is shown.

FIG. 4 is diagrams explaining modeling of a fan/compressor element of the gas turbine engine. This fan/compressor element is equivalent to the compressor in the model of the actual gas turbine engine shown in FIG. 2. Moreover, the fan/compressor element is also equivalent to a portion corresponding to a part of the high-pressure turbine at the subsequent stage to the combustor.

Figure 4A:
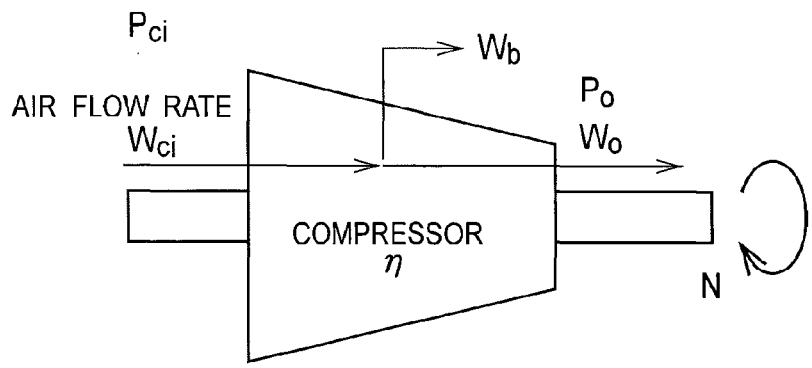
FIG. 4A is a diagram explaining a fan/compressor element.

As shown in FIG. 4A, the fan/compressor element is an adiabatic efficiency $\eta$ and the number of revolutions N of a rotor machine, wherein an element inlet air pressure is Pci, an element inlet air flow rate is Wci, an element outlet air pressure is Po, an element outlet air flow rate is Wo, and a bleeding air flow rate is Wb.

Figure 4B:
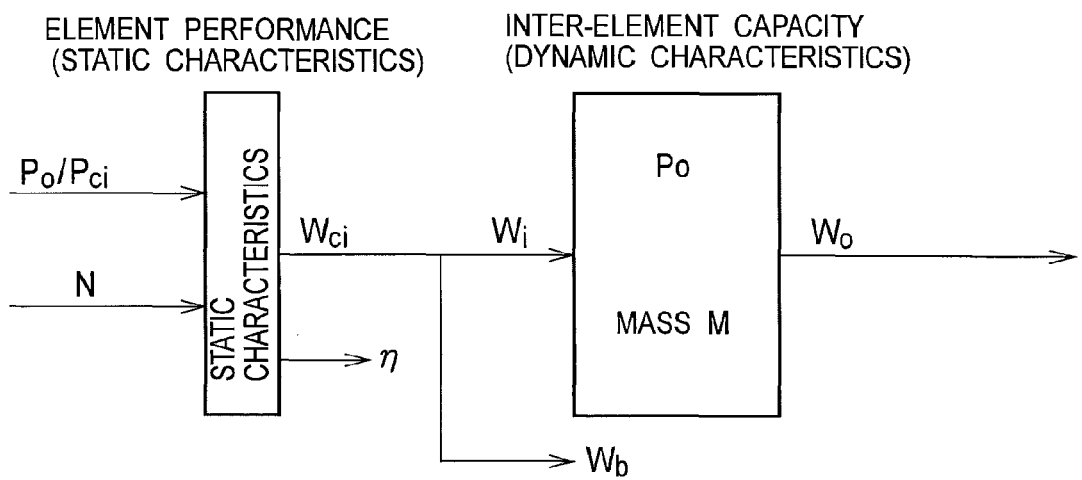
FIG. 4B is a diagram explain a relationship between element performance of the fan/compressor element and inter-element capacity.

FIG. 4B shows a relationship between element performance of the fan/compressor element and an inter-element capacity with regard to these variables The inter-element capacity is equivalent to an outlet capacity of the fan/compressor element.

The element performance is static characteristics in which the element inlet air flow rate Wci and the adiabatic efficiency $\eta$ are determined in response to the number of revolutions N and a ratio Po/Pci of the element outlet air pressure Po to the element inlet air pressure Pci. The inter-element capacity is dynamic characteristics in which the pressure Po and mass M of a capacity are determined in response to a difference Wo-WI between a capacity outlet air flow rate Wo and a capacity inlet air flow rate Wi. Here, the element inlet air flow rate Wi is Wci-Wb obtained by subtracting the bleeding air flow rate Wb from the element inlet air flow rate Wci.

Figure 5:
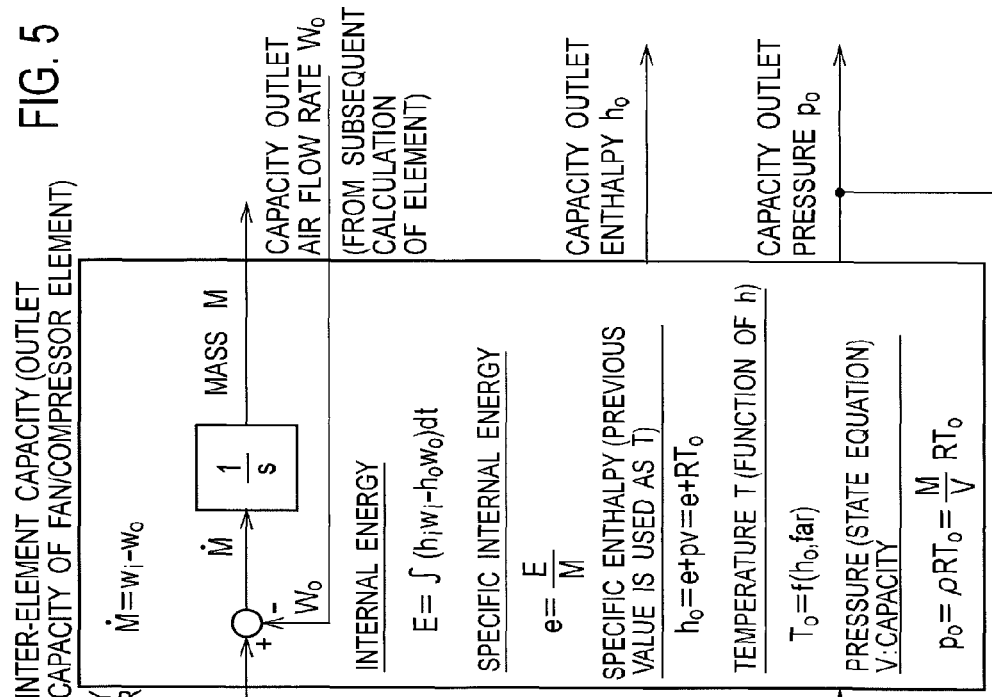
FIG. 5 is a diagram explaining a relationship between the fan/compressor element and an inter-element capacity.
Figure 5:
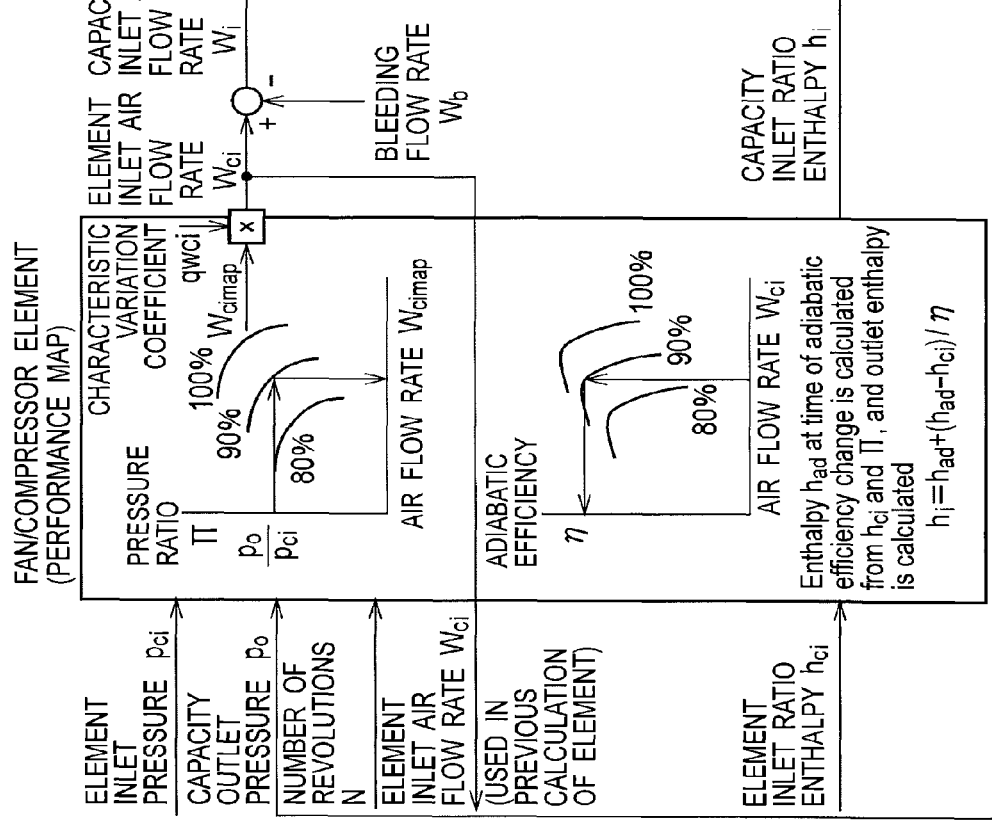

FIG. 5 is a diagram explaining a relationship between the fan/compressor element and the inter-element capacity which are shown in FIG. 4B. To the fan/compressor element, there are inputted the element inlet pressure Pci, the number of revolutions N, and an element inlet ratio enthalpy hci. Moreover, a capacity outlet pressure P0 is inputted from the inter-element element at the subsequent stage.

The fan/compressor element determines an air flow rate Wci map, which corresponds to a pressure ratio $\Pi=P0/Pci$ of the capacity outlet pressure P0 to the capacity inlet pressure Pci, in accordance with a map of characteristic curves which indicate a relationship between an air flow rate Wciz and the pressure ratio $\Pi=P0/Pci$. The fan/compressor element outputs a value, which is obtained by multiplying this value by the performance parameter (flow rate characteristic variation coefficient) qwci, as the element inlet air flow rate Wci.

Moreover, the fan/compressor element determines the adiabatic efficiency $\eta$, which corresponds to the element inlet air flow Wci, in accordance with a map of characteristic curves which indicate a relationship between the air flow rate Wci and the adiabatic efficiency $\eta$. Then, the fan/compressor element outputs a capacity inlet ratio enthalpy hi calculated based on the element inlet ratio enthalpy hci, the pressure ratio $\Pi$, and the adiabatic efficiency $\eta$.

In the map indicating the relationship between the air flow rate Wci and the pressure ratio $\Pi$ and in the map indicating the air flow rate Wci and the adiabatic efficiency $\eta$, pluralities of the characteristic curves are drawn. These characteristic curves are selected, for example, based on efficiency of the fan/compressor element. In the drawing, a characteristic curve equivalent to efficiency of 90% is selected.

To the inter-element capacity, there is inputted an element inlet air flow rate Wi obtained by subtracting the bleeding air flow rate Wb from the element inlet air flow rate Wci coming from the fan/compressor element, and there is inputted the capacity inlet ratio enthalpy hi is inputted from the fan-compressor element. Moreover, a capacity outlet air flow rate Wo is inputted from an element at a subsequent stage.

In the inter-element capacity, an air flow rate obtained by subtracting the capacity outlet container flow rate Wo from the capacity inlet air flow rate Wi is a time derivative of the mass. The inter-element capacity outputs the mass M obtained by integrating this time derivative of the mass. Moreover, a capacity outlet enthalpy ho and the capacity outlet pressure po are calculated and outputted based on the capacity inlet air flow rate Wi, the capacity outlet air flow rate Wo, the mass M and the like.

The model of the actual gas turbine engine shown in FIG. 2 is configured as follows based on such a relationship between the fan/compressor element and the inter-element capacity.

An air flow rate W25map in the compressor simulates an air flow rate determined by the map of the characteristic curves of the high-pressure compressor. Therefore, W25map is defined as a sum of a value proportional to the number of revolutions NG of a rotor machine by a first gain element 11, and of a value proportional to outlet pressure P3 of the compressor by a second gain element 12.

In the compressor, as shown in the fan/compressor element of FIG. 5, the air flow rate W25map is multiplied by the performance parameter (flow rate characteristic variation coefficient) qwci, and a product thus obtained is defined as an element inlet air flow rate W25. In the inter-element capacity, a value obtained by subtracting W3 serving as an outflow air flow rate from W25 serving as an inflow air flow rate becomes the time derivative of the mass, and accordingly, the value W25−W3 is integrated, whereby M3 is obtained. Moreover, it is assumed that pressure P3 in the inter-element capacity is proportional to the mass M3 by a third gain element 13.

A time derivative of the outlet air flow rate W3 of the inter-element capacity is proportional to such a value obtained by subtracting the outlet pressure from the inlet pressure, and accordingly, as this outlet air flow rate W3, a value is defined, which is obtained by integrating a difference P3−P4 obtained by subtracting P4 serving as the outlet pressure from P3 serving as the inlet pressure.

In the combustor, in the inter-element capacity, a time derivative of a mass M4 is a value obtained by subtracting W4 serving as an outflow gas flow rate from an inflow gas flow rate obtained by adding a fuel flow rate WF to the outlet air flow rate W3 of the high-pressure compressor. Hence, the mass M4 is obtained by integrating these values. Moreover, it is assumed that the gas pressure P4 of the combustor is proportional to the mass M4 by a sixth gain element 16.

In a portion corresponding to the high-pressure turbine at the subsequent stage to the combustor, a gas flow rate determined by a map of characteristic curves in the high-pressure turbine is simulated. Therefore, the outlet gas flow rate W4 of the high-pressure turbine is defined as a sum of a value made proportional to the number of revolutions NG of the rotor machine by a ninth gain element 21, and of a value made proportional to the gas pressure P4 of the combustor by an eighth gain element 20.

A time derivative of the number of revolutions NG of the rotor machine is proportional to a value obtained by subtracting a torque of the high-pressure compressor from a torque of the high-pressure turbine. Hence, the number of revolutions NG of the rotor machine is obtained by integrating this value. The torque of the high-pressure turbine and the torque of the high-pressure compressor are defined as a value made proportional to the gas pressure P4 of the combustor by a fifth gain element 15, and as a value made proportional to the gas pressure P3 of the high-pressure compressor by a seventh gain element 19, respectively.

Figure 6:
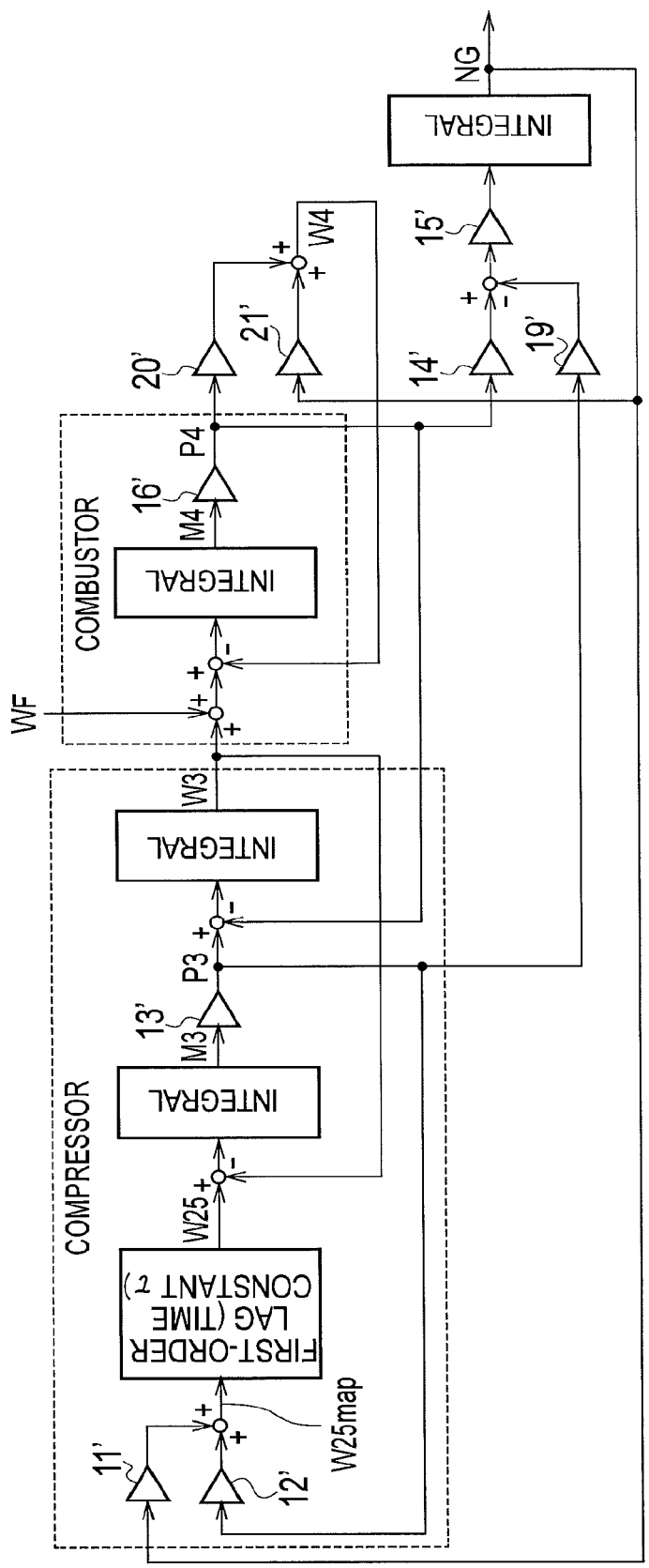
FIG. 6 is a diagram showing a configuration of a Kalman filter.

FIG. 6 is a diagram showing a configuration of the Kalman filter in the gas turbine engine estimation device shown in FIG. 1. In comparison with the model of the actual gas turbine engine shown in FIG. 2, the Kalman filter of this embodiment is different therefrom in that the first-order lag element is substituted for the multiplier that multiplies the performance parameter (flow rate characteristic variation coefficient) qwci in the model the actual gas turbine engine.

Figure 7:
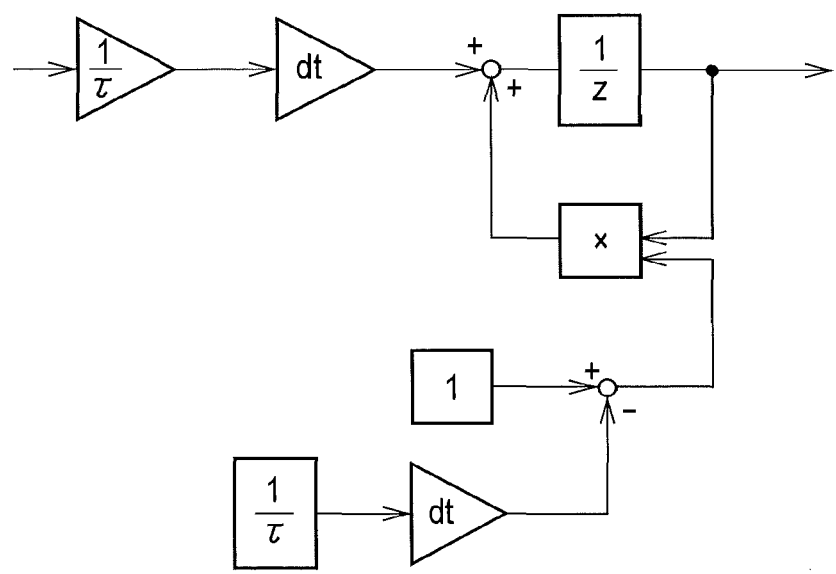
FIG. 7 is a diagram showing a configuration of a first-order lag element.

FIG. 7 is a diagram showing a configuration of the first-order lag element. The first-order lag element includes the configuration of the integral element, and has a predetermined time constant τ. In this embodiment, the first-order lag element includes the increment dt of the discrete time in order to perform the simulation by the discrete time.

The Kalman filter can be represented by such an expression as follows with regard to a state x, a performance parameter q, a sensor parameter y, and an input u. t is the discrete time, and the increment of the discrete time is Δt. x is a column vector of an n row, q is a column vector of a p row, y is a column vector of an m row, and u is a column vector of an l row.

[Expression 1]

$$\begin{cases} x_{t+1} = f(x_t, u_t, q_t) \\ q_{t+1} = q_t \\ y_t = g(x_t, u_t) \end{cases} \quad (1)$$

In general, the state x describes a state in the dynamic system, such as the number of revolutions of the rotor machine, and internal energy and enthalpy of each of the elements. The performance parameter is a characteristic variation coefficient that prescribes performance of each of the elements such as the flow rate and the efficiency, which compose the dynamic system. The sensor parameters are observed values of the number of revolutions of the rotor machine, the temperature, the pressure and the like, the observed value being detected by sensors from the outside of the dynamic system.

Specifically, the Kalman filter shown in FIG. 6 includes, as the state x, such parameters as follows.

TABLE 1

| Parameter | Meaning of parameter |
| --- | --- |
| NG | number of revolutions of rotor machine |
| M3 | mass in compressor capacity |
| M4 | mass in combustor capacity |
| VV25 | compressor inlet air flow rate |
| VV3 | compressor outlet air flow rate |

The Kalman filter includes such a parameter as follows, as the performance parameter q.

TABLE 2

| Parameter | Meaning of parameter |
| --- | --- |
| qwci | flow rate characteristic variation coefficient |

The Kalman filter includes such a parameter as follows, as the sensor y.

TABLE 3

| Parameter | Meaning of parameter |
| --- | --- |
| NG | number of rotations of rotor machine |

The Kalman filter includes such a parameter as follows, as the input u.

TABLE 4

| Parameter | Meaning of parameter |
| --- | --- |
| VVF | fuel flow rate |

Expression (1) can be linearized as follows.

[Expression 2]

$$\begin{cases} \Delta x_{t+1} = F\Delta x_t + B\Delta u_t + L\Delta q_t + G^{(x)}w_t^{(x)} \\ \Delta q_{t+1} = \Delta q_t + G^{(q)}w_t^{(q)} \\ \Delta y_t = H\Delta x_t + v_t \end{cases} \quad (2)$$

When Expression (2) is subjected to matrix representation, Expression (3) is obtained as follows. A stationary Kalman filter is designed based on this Expression (3).

[Expression 3]

$$\begin{cases} \begin{bmatrix} \Delta x_{t+1} \\ \Delta q_{t+1} \end{bmatrix} = \begin{bmatrix} F & L \\ 0 & I_p \end{bmatrix}\begin{bmatrix} \Delta x_t \\ \Delta q_t \end{bmatrix} + \begin{bmatrix} B \\ 0 \end{bmatrix}\Delta t_t + \begin{bmatrix} G^{(x)} & 0 \\ 0 & G^{(0)} \end{bmatrix}\begin{bmatrix} w_t^{(x)} \\ w_t^{(0)} \end{bmatrix} \\ \Delta y_t = [H\ 0]\begin{bmatrix} \Delta x_t \\ \Delta q_t \end{bmatrix} + v_t \end{cases} \quad (3)$$

However, a column vector of a following (n+p) row is prescribed.

[Expression 4]

$$x_q \equiv \begin{bmatrix} x \\ q \end{bmatrix} \quad (4)$$

Moreover, when Expression (1) with a discrete form is described in a continuous form, Expression (5) is obtained. Here, a first-row expression and a second-row expression can be bundled into one expression by using the vector prescribed by Expression (4).

[Expression 5]

$$\begin{cases} \begin{cases} \dot{x} = f(x, u) \\ \dot{q} = 0 \end{cases} \Rightarrow \dot{x}_q = f_q(x_q, u) \\ y = g(x_q, u) \end{cases} \quad (5)$$

The Kalman filter is established as follows.

[Expression 6]

$$\begin{cases} \dot{\hat{x}}_q = f_q(\hat{x}_q, u) + K(y - \hat{y}) \\ \hat{y} = g(\hat{x}_q, u) \end{cases} \quad (6)$$

When the Kalman filter is linearized, Expression (7) is obtained as follows.

[Expression 7]

$$\begin{cases} \dot{\hat{x}}_q = A\hat{x}_q + Bu + K(y - \hat{y}) \\ \hat{y} = C\hat{x}_q + Du \end{cases} \quad (7)$$

Here, providing that (A, C) is observable, $x_q$ including the performance parameter can be estimated, and accordingly, there are such a restriction as follows. That is to say, as in Expression (8) described below, the number of performance parameters capable of being estimated is equal to or smaller than the number of sensors. This Expression (8) is derived in Appendix 1 in a tail end of this description. In the system in FIG. 6, which is shown as an example, both sides of Expression (8) are individually 1 as in Table 2 and Table 3, and Expression (8) is established. (number of performance parameters q)≤(number of sensors y) ... (8)

However, the state x is not subjected to restriction of the number of sensors, in which (A, C) simply need to be observable (this matter is also shown in Appendix 1). From this fact, a part of live performance parameters q to be estimated is included as the state x, whereby Expression (7) can be established. In other words, it becomes possible to increase the number of estimated performance parameters more than the number of sensors. A part of the performance parameters q is turned to the state x, whereby the state x has dynamic characteristics as obvious in a first expression of Expression (7).

In this embodiment, a reason why a part of the performance parameters q can be turned to the state x is that each of the performance parameters q is an output value of an integral element having dynamic characteristics. In other words, an integral value becomes the state x, and accordingly, the integral element is substituted for an element corresponding to the performance parameter q, whereby the performance parameter q can be turned from a mere coefficient to a part of the state x. This matter can be realized, for example, by substituting the first-order lag element for the multiplier into which the performance parameter q is introduced.

Figure 8A:
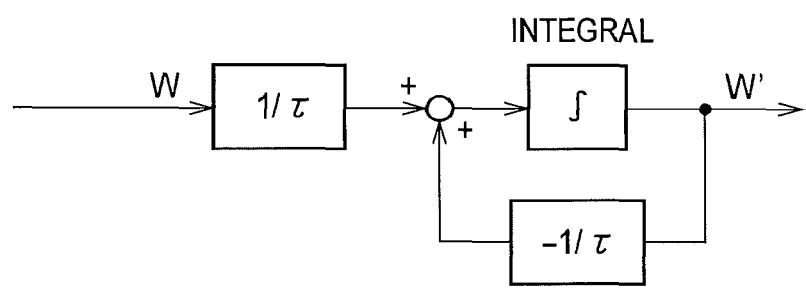
FIG. 8A is a diagram explaining a first-order lag.

FIG. 8 is diagrams explaining the first-order lag element. As shown in FIG. 8A, with regard to the predetermined time constant τ, an input value W to the first-order lag element is multiplied by 1/τ, and an output W' multiplied by [[−1/τ]]−1/τ is added thereto. A sum of these is integrated to become an output value W'.

Figure 8B:
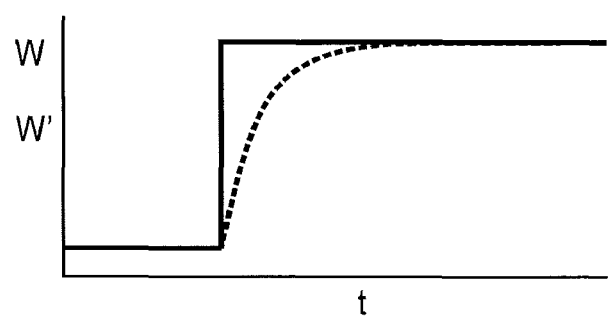
FIG. 8B is another diagram explaining the first-order lag.

In FIG. 8B, when such a step function W as shown by a solid line in the drawing is inputted to the first-order lag element, the output W' with such a shape as gradually following the step input is obtained as shown by a broken line in the drawing.

This output W' uses an integral computation, and accordingly, can be included in a part of the state x. The output W' of the first-order lag element is adjusted by the Kalman filter, and causes a difference from the input to the first-order lag element. The temporal change of the performance, which is equivalent to the performance parameter 1, can be obtained by a ratio W'/W of the output value of the first-order lag to the input value thereof.

Figure 9:
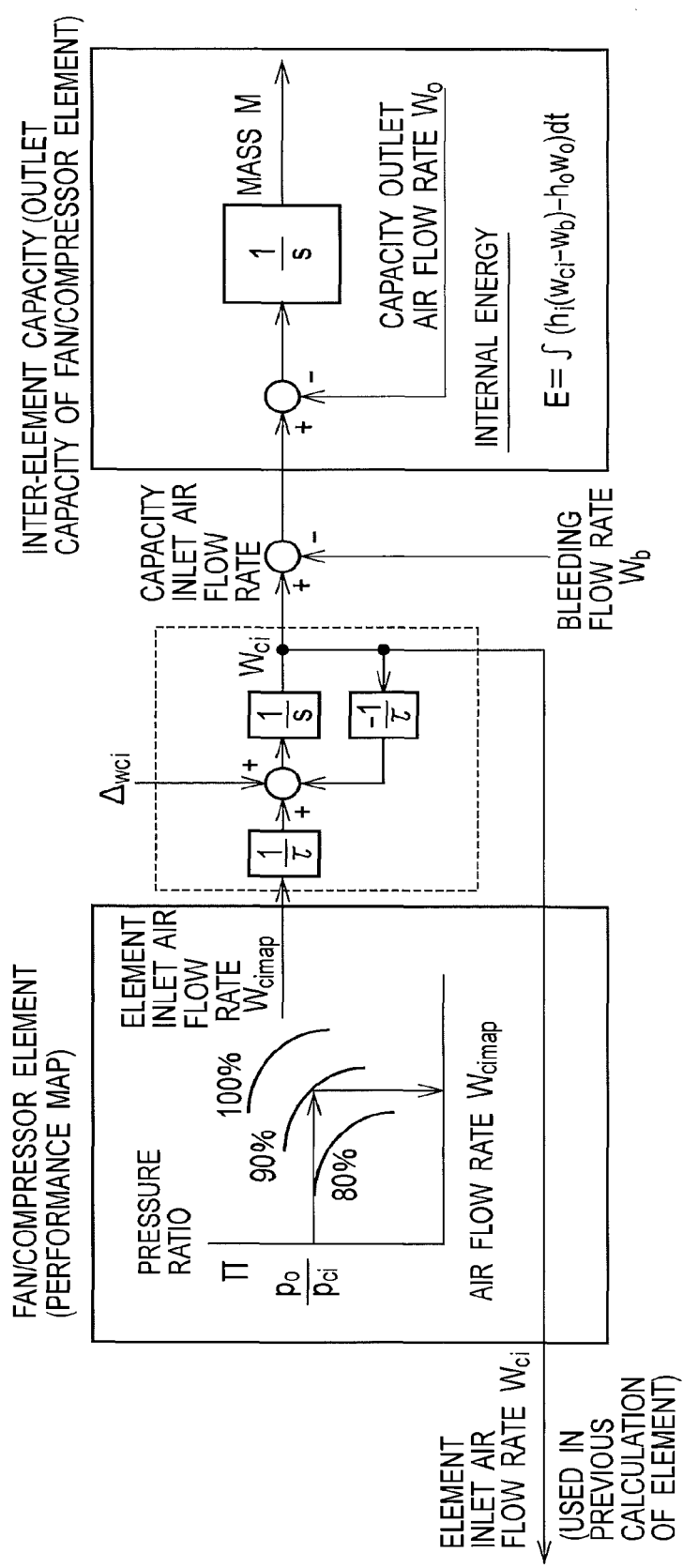
FIG. 9 is a diagram in which the first-order lag is substituted for a multiplier in FIG. 5.

FIG. 9 is a diagram in which the first-order lag element is substituted for the multiplier into which the performance parameter (flow rate characteristic variation coefficient) qwci is introduced in the configuration of FIG. 5. By such a first-order lag element as described above, the capacity inlet air flow rate Wci becomes an integral value, and can be included as a part of the state x.

In this first-order lag element, a product obtained by multiplying, by $(-1/\tau)$, the capacity inflow air mass Wci as an output of this first-order lag element is added to a product obtained by multiplying, by $1/\tau$, the element inlet air flow rate Wci map from the fan/compressor element, and further, a variation ΔWci of the element inlet flow rate Wci is added thereto. Then, a sum of these is integrated to obtain the capacity inflow air mass Wci serving as an output.

In the configuration of FIG. 9, the performance parameter (flow rate characteristic variation coefficient) qwci is not used; however, a value equivalent thereto is given as the ratio of the element inlet air flow rate Wci map to the capacity inflow air mass Wci. In other words, the first-order lag element is introduced, whereby the temporal change of the performance parameter qwci which has been originally a constant can be obtained.

Next, a simulation was implemented in the gas turbine engine estimation device having such a configuration. This simulation was performed by the discrete time. Therefore, the first-order lag element of the predetermined time T, which is represented in Expression (8), was discretized and applied as follows.

[Expression 8]

$$Y = \frac{1}{1+\tau s} X$$

Derivation of Expression (9) is described as Appendix 2 in the tail end of this description.

$$Y_n = X_n + K \cdot (X_n - Y_{n-1})$$ [Expression 9]

EXAMPLE 1

As Example 1 of the gas turbine engine estimation device, a simulation was performed under conditions where both of the discrete time dt and the first-order lag time τ were set to 0.0025, and a magnitude (variance) of system noise in the performance parameter (flow rate characteristic variation coefficient) qwci was set to $1 \times 10^{-5}$.

Gains of the respective gain elements of this gas turbine engine estimation device were set as follows.

TABLE 5

| Gain element | |
|---|---|
| first gain element 11, 11' | 10 |
| second gain element 12, 12' | -5 |
| third gain element 13, 13' | 1 |
| fourth gain element 14, 14' | 0.1 |
| fifth gain element 15, 15' | 10 |
| sixth gain element 16, 16' | 1 |
| seventh gain element 19, 19' | 0.2 |
| eighth gain element 20, 20' | 20 |
| ninth gain element 21, 21' | 20 |

Figure 10:
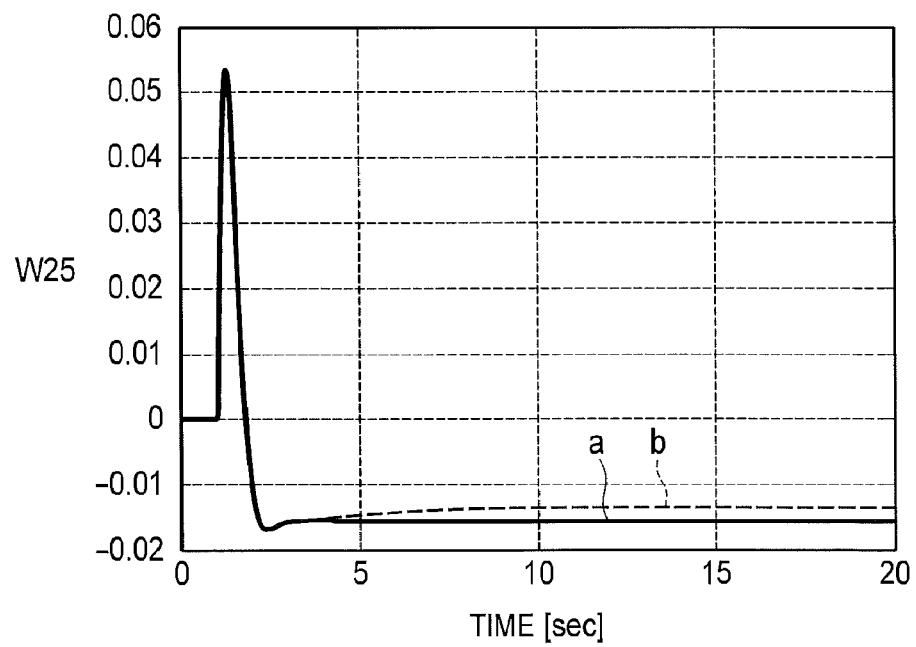
FIG. 10 is a graph showing results of Example 1.

FIG. 10 shows a temporal change of the capacity inlet air flow rate W25 obtained by the simulation. In the drawing, a solid line is a true value obtained by the model of the actual gas turbine engine, and a broken line is an estimated value obtained by the first-order lag element. The same applies below.

In the drawing, a deviation occurs between the true value and the estimated value with the elapse of time; however, a value of this deviation is small. Hence, it can be concluded that, in this Example 1, the Kalman filter can nicely estimate the operations of the actual turbine machine. It can be concluded that a state w25 hat obtained through the first-order lag can be estimated without estimating the performance parameter (characteristic variation variable)

EXAMPLE 2

Figure 11:
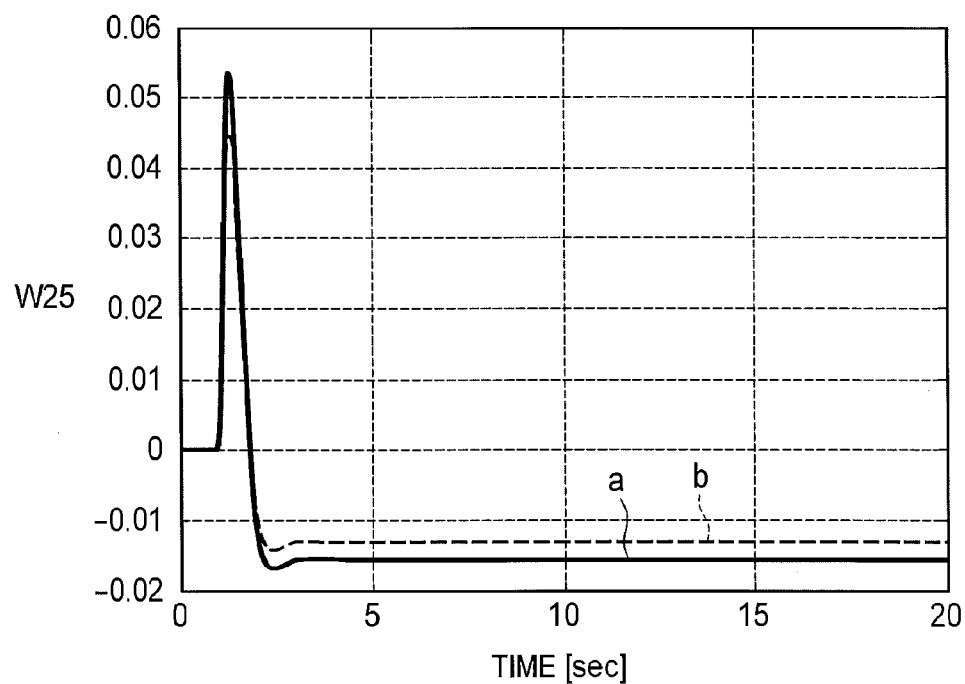
FIG. 11 is a graph showing results of Example 2.

In Example 2, a simulation was performed under a condition where the magnitude (variance) of the system noise in the performance parameter (flow rate characteristic variation coefficient) qwci was increased to $1 \times 10^{10}$ in contrast to Example 1 ($1 \times 10^{-5}$). Other configurations are similar to those of Example 1. FIG. 11 shows a temporal change of the capacity inlet air flow rate W25 of Example 2. A deviation occurs between the true value and the estimated value with the elapse of time; however, a value of this deviation is similar to that of Example 1.

EXAMPLE 3

Figure 12:
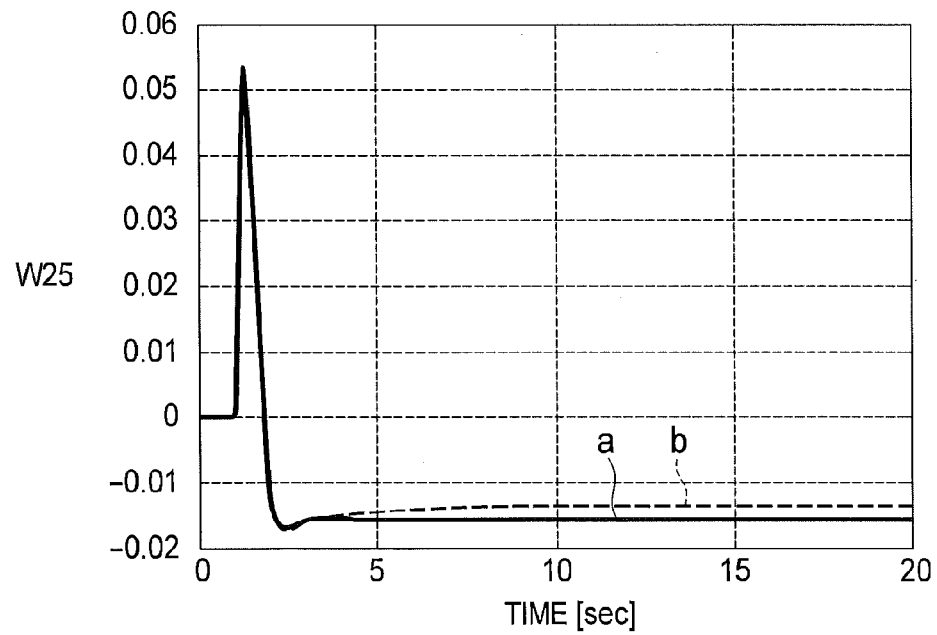
FIG. 12 is a graph showing results of Example 3.

In Example 3, a simulation was performed under a condition where the first-order lag time τ was increased to 0.025 that was as large as ten times the discrete time in contrast to Example 1. Other configurations are similar to those of Example 1. FIG. 12 shows a temporal change of the capacity inlet air flow rate W25 of Example 3. A deviation between the true value and the estimated value, which is caused with the elapse of time, is similar to that of Example 1.

EXAMPLE 4

Figure 13:
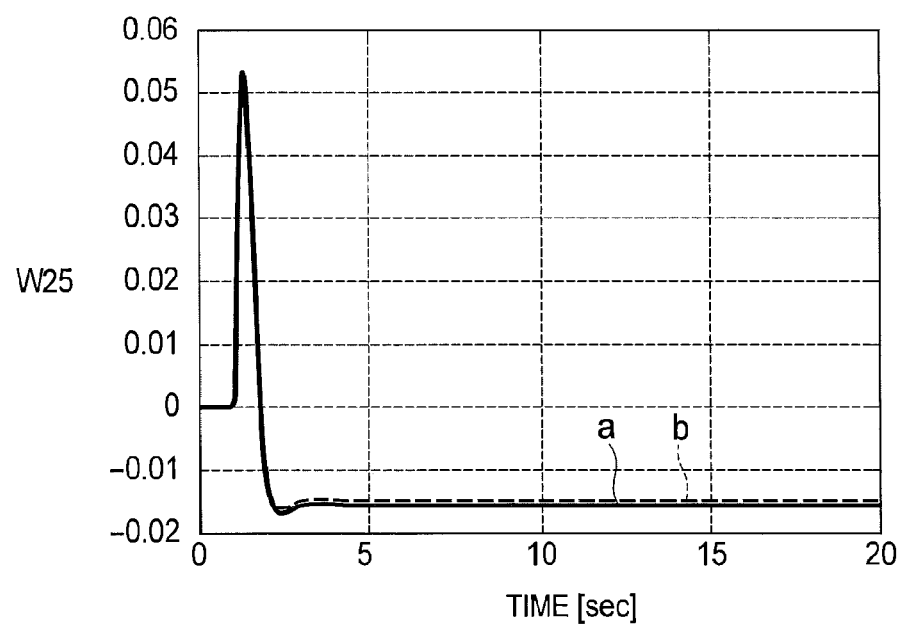
FIG. 13 is a graph showing results of Example 4.

In contrast to Example 1, in Example 4, a simulation was performed under a condition where the first-order lag time τ was increased to 0.025 that was as large as ten times the discrete time, and further, the magnitude (variance) of the system noise in the performance parameter (flow rate characteristic variation coefficient) qwci was increased to $1 \times 10^{10}$. FIG. 13 shows a temporal change of the capacity inlet air flow rate W25 by Example 4. A deviation between the true value and the estimated value became smallest among those of Examples 1 to 4.

COMPARATIVE EXAMPLE

Figure 14:
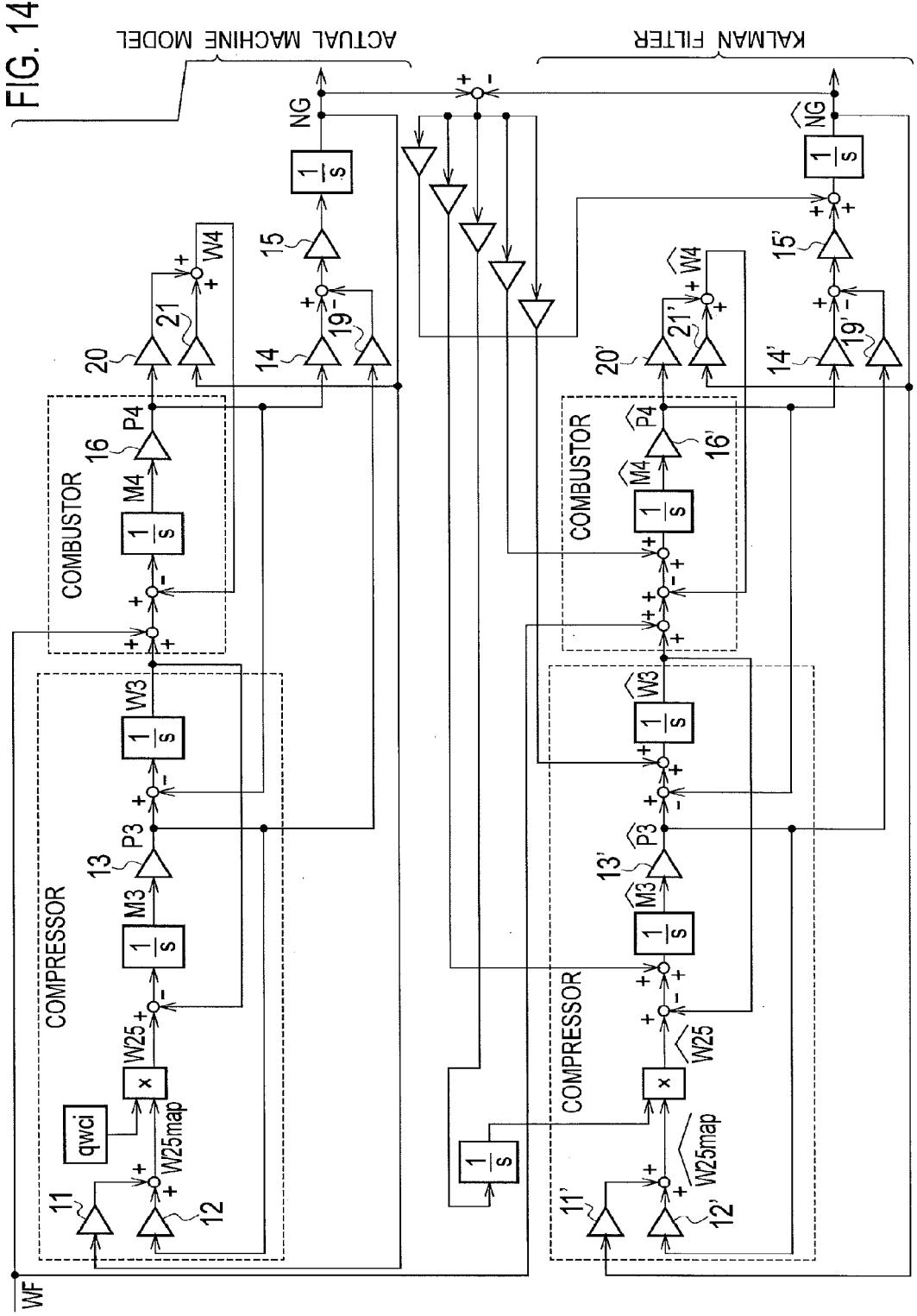
FIG. 14 is a diagram showing a configuration of a gas turbine engine estimation device including a conventional Kalman filter.

FIG. 14 is a diagram showing, for comparison, a configuration of a gas turbine engine estimation device including a conventional Kalman filter. This gas turbine engine estimation device is different from that of this embodiment in that the first-order lag element is not provided in order to estimate the capacity inlet air flow rate W25.

In the conventional Kalman filter as described above, the number of performance parameter capable of being estimated has had to be equal to or smaller than the number of sensors. Note that hats are put onto estimated values in the Kalman filter.

Figure 15:
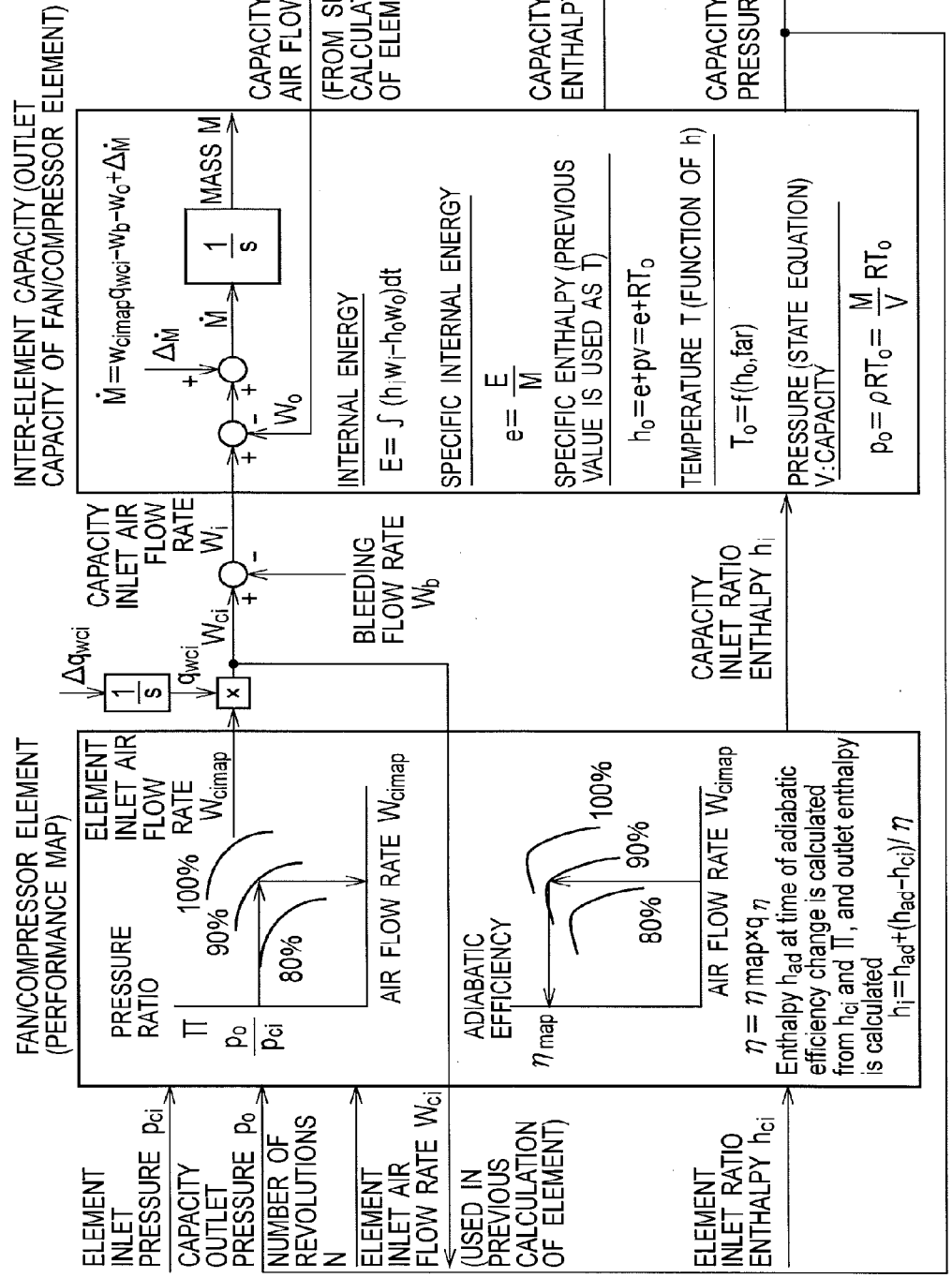
FIG. 15 is a diagram showing a correction by the Kalman filter.

FIG. 15 is a diagram in which a correction by the Kalman filter is implemented in the configuration of the fan/compression element and the inter-element capacity, which is shown in FIG. 5. The adiabatic efficiency η of the model of the actual gas turbine engine is given as ηmap×qη that is a product obtained by multiplying a performance parameter (adiabatic efficiency characteristic variation coefficient) qη by adiabatic efficiency ηmap obtained from a map of characteristic curves by the correction using the Kalman filter. The performance parameter (flow rate characteristic variation coefficient) qwci is given by integrating a variation Δqwci by the integral element.

The variation represented by Expression 10 is added to the time derivative of the mass M of the inter-element capacity.

$$\dot{M} = W_{cimap} q_{wci} - w_b - w_b + \Delta \dot{M} \quad \text{[Expression 10]}$$

The time derivative of the mass M is given by a following expression, and the variation of the time derivative of the mass M is substituted for the correction by the performance parameter qwci.

$$\Delta \dot{M} \quad \text{[Expression 11]}$$

Note that, in this embodiment, the dynamic system is applied to the gas turbine engine; however, the present embodiment is not limited to this. The present embodiment can be applied in order to estimate the performance parameters, of which number is larger than the number of sensors, in a variety of engines, plants, and the like.

APPENDIX 1

Referring to Expression 3, the observable matrix of this embodiment is given by Expression 12.

[Expression 12]

$$M_{O,D} = \begin{bmatrix} F' \\ H'F' \\ H'F'^2 \\ \vdots \\ H'F'^{m-1} \end{bmatrix}$$

$$= \begin{bmatrix} H & 0 \\ HF & HL \\ HF^2 & HFL + HL \\ HF^3 & HF^2 L + HFL + HL \\ \vdots & \vdots \\ HF^{n+p-1} & HF^{n+p-2}L + \cdots + HF^2 L + HFL + HL \end{bmatrix}$$

If this observable matrix has a full rank, then the matrix becomes observable.

Here, Expressions 13 to 15 are established.

[Expression 13]

$$F' = \begin{bmatrix} F & L \\ 0 & I_p \end{bmatrix}$$

[Expression 14]

$$B' = \begin{bmatrix} B \\ 0 \end{bmatrix}$$

[Expression 15]

$$H' = [H \quad 0]$$

Matrices F', B' and H' individually include elements of Expression 16 in the row direction and the column direction.

F':(n+p)×(n+p)

B':(n+p)×r

H':m×(n+p) [Expression 16]

The observable matrix can be decomposed as follows.

[Expression 17]

$$M_{O,D} = \begin{bmatrix} I_m & 0 & \cdots & 0 \\ I_m & I_m & \ddots & \vdots \\ \vdots & & \ddots & 0 \\ I_m & \cdots & I_m & I_m \end{bmatrix} \begin{bmatrix} I & 0 \\ 0 & H \\ 0 & HF \\ 0 & HF^2 \\ \vdots & \vdots \\ 0 & HF^{n-1} \\ 0 & HF^n \\ \vdots & \vdots \\ 0 & HF^{n+p-1} \end{bmatrix} \begin{bmatrix} H & 0 \\ F-I & L \end{bmatrix} = I^{(D)} T S_D$$

Here, matrices $M_{O,D}$, $I^{(D)}$, T and $S_D$ individually include elements of Expression 18 in the row direction and the column direction.

$M_{O,D}$:m(n+p)×(n+p) [Expression 18]

$I^{(D)}$:m(n+p)×(n+p)

T:m(n+p)×(n+m)

$S_D$:(n+m)×(n+p)

Here, in general, a following relational expression is established with regard to the rank of the matrix rank(AB)≤min(rank(A),rank(B)) [Expression 19]

When this relational expression is applied to the expression in which the observable matrix is decomposed, then a relational expression as follows is obtained.

rank($M_{O,D}$)≤min(rank($I^{(D)}$),rank(T),rank($S_D$)) [Expression 20]

Providing that the ranks of $I^{(D)}$, T and $S_D$ of the respective decomposed elements become n+p or more, a rank of the observable matrix, which is represented in Expression 21, can achieve the full rank rank($M_{O,D}$)=n+p [Expression 21]

The matrix $S_D$ is an (n+m)×(n+p) matrix, and accordingly, n+p≤n+m, that is, p≤m is an condition that allows the rank thereof to become n+p or more.

Hence, the matter that the rank becomes n+p is restricted by a condition: "the number p of performance parameters q is equal to or smaller than the number m of sensors y". If this result is applied to Expression 7, providing that (A, C) is observable, Expression (8) in which the number of performance parameters is equal to or smaller than the number of sensors can be obtained.

Next, in the matrix T, there is included an observable matrix $M^{(x)}_0$ of a system (F, H) of an engine model that does not include the performance parameter.

[Expression 22]

$$T = \begin{bmatrix} I_m & 0 \\ 0 & M_O^{(x)} \\ 0 & * \end{bmatrix}$$

When (F, H) is observable, $M^{(x)}_0$ has a full rank and establishes Expression 23

$$\text{rank}(M_O^{(x)}) = n \quad \text{[Expression 23]}$$

At this time, Expression 24 is obviously established based on the configuration of the matrix T, and the matrix T also has a full rank.

$$\text{rank}(T) = n + m \quad \text{[Expression 24]}$$

Hence, the state x that does not include the performance parameters is not restricted by the number of sensors. If this result is applied to Expression 7, then it is understood that (A, C) simply needs to be observable.

APPENDIX 2

The first-order lag element is described by the discrete time in order to make a simulation by the discrete time. The first-order lag element is represented as follows.

[Expression 25]

$$Y = \frac{1}{1+\tau s} X$$

This expression can be modified as follows.

$$X = (1+\tau s) \cdot Y = Y + \tau \dot{Y} \quad \text{[Expression 26]}$$

Both sides of this expression are multiplied by an element in Expression 27.

[Expression 27]

$$e^{\frac{t}{\tau}}$$

Then, Expression 28 is established as follows.

[Expression 28]

$$e^{\frac{t}{\tau}} \cdot X = e^{\frac{t}{\tau}} \cdot Y + \tau \cdot e^{\frac{t}{\tau}} \cdot \dot{Y}$$

Moreover, Expression 28 can be summarized as follows.

[Expression 29]

$$e^{\frac{t}{\tau}} \cdot X = \tau \cdot (e^{\frac{t}{\tau}} \cdot Y)'$$

Both sides of Expression 29 are integrated.

[Expression 30]

$$\int_{t-\Delta t}^{t} (e^{\frac{t}{\tau}} \cdot X) dt = \tau \int_{t-\Delta t}^{t} (e^{\frac{t}{\tau}} \cdot Y) dt$$

Here, if X=Xn is held (sample holding) during a period from t-Δt to t, Expression 31 is established.

[Expression 31]

$$X_n \cdot \tau \cdot [e^{\frac{t}{\tau}}]_{t-\Delta t}^{t} = \tau \cdot [e^{\frac{t}{\tau}} \cdot Y]_{t-\Delta t}^{t}$$

Moreover, from Expression 32, a following expression (Expression 33) is obtained.

[Expression 32]

$$X_n \cdot \left( e^{\frac{t}{\tau}} - e^{\frac{t}{\tau}} \cdot e^{-\frac{\Delta t}{\tau}} \right) = e^{\frac{t}{\tau}} \cdot Y_n - e^{\frac{t}{\tau}} \cdot e^{\frac{\Delta t}{\tau}} \cdot Y_{n-1}$$

Note that slashes in the expression (Expression 33) indicate the number canceled on both sides.

[Expression 33]

$$Y_n = X_n - e^{\frac{\Delta t}{\tau}} \cdot (X_n - Y_{n-1})$$

Here, if

[Expression 34]

$$K = e^{\frac{\Delta t}{\tau}}$$

is established, the expression of the first-order lag with the discrete form is established like Expression 35.

$$Y_n = X_n + K \cdot (X_n - Y_{n-1}) \quad \text{[Expression 35]}$$

While embodiments have been exemplified with the help of the drawings, many modifications and changes are apparent to those skilled in the art.

What is claimed is:

1. A dynamic system estimation device that estimates a state and performance parameters of a dynamic system, comprising:
    a predetermined number of sensors which detect predetermined observed values from the dynamic system; and
    a Kalman filter that estimates the state of the dynamic system by using a dynamic model of the dynamic system based on the observed values detected by the sensors,
    wherein the dynamic system includes elements in which temporal changes of performance are described by the performance parameters, and the Kalman filter also enables estimation of performance parameters, of which number is larger than the predetermined number, by introducing first-order lag elements in place of the elements.

2. The estimation device according to claim 1, wherein each of the performance parameters is given as a ratio of an output value of the first-order lag element to an input value of the first-order lag element.

3. The estimation device according to claim 1, wherein the dynamic system is a gas turbine engine, and the observed values detected by the sensors include a number of revolutions, a temperature and a pressure in the gas turbine engine.

4. The estimation device according to claim 2, wherein the dynamic system is a gas turbine engine, and the observed values detected by the sensors include number of revolutions, temperature and pressure in the gas turbine engine.

5. A dynamic system estimation method for estimating a state and performance parameters of a dynamic system, comprising:
- a step of detecting predetermined observed values from the dynamic system by a predetermined number of sensors; and
- a step of estimating the state of the dynamic system by a Kalman filter based on the observed values detected by the sensors, the Kalman filter using a dynamic model of the dynamic system,
- wherein the dynamic system includes elements in which temporal changes of performance are described by the performance parameters, and the Kalman filter also enables estimation of performance parameters, of which number is larger than the predetermined number, by introducing first-order lag elements in place of the elements.

* * * * *